US012038153B1

(12) United States Patent
Hu

(10) Patent No.: US 12,038,153 B1
(45) Date of Patent: Jul. 16, 2024

(54) SAFETY FOCUSING IGNITION FLASHLIGHT DEVICE

(71) Applicant: GUANGZHOU TIANHUO ELECTRONIC TECHNOLOGY CO., LTD., Guangzhou (CN)

(72) Inventor: Yong'en Hu, Guangzhou (CN)

(73) Assignee: GUANGZHOU TIANHUO ELECTRONIC TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 18/333,559

(22) Filed: Jun. 13, 2023

(30) Foreign Application Priority Data

Dec. 28, 2022 (CN) ........................ 202223546478.3

(51) Int. Cl.
*F23Q 2/32* (2006.01)
*F21L 4/04* (2006.01)
(Continued)

(52) U.S. Cl.
CPC ............ *F21V 14/065* (2013.01); *F21V 5/048* (2013.01); *F21V 17/002* (2013.01); *F21V 25/00* (2013.01);
(Continued)

(58) Field of Classification Search
CPC ... F21L 4/005; F21L 4/022–027; F21L 4/045; F21L 4/085; F21V 17/002; F21V 14/065; F23Q 2/32; F23Q 13/005
See application file for complete search history.

(56) References Cited

U.S. PATENT DOCUMENTS 2,494,886 A * 1/1950 Leif .......................... F23Q 2/32 362/199
2009/0046452 A1* 2/2009 Huang .................... G09F 23/00 362/205
(Continued)

FOREIGN PATENT DOCUMENTS

CN 117663019 A * 3/2024

OTHER PUBLICATIONS

Machine Translation of CN117663019A, retrieved from worldwide.espacenet.com on Mar. 28, 2024 (Year: 2024).*

*Primary Examiner* — Abdulmajeed Aziz
*Assistant Examiner* — Steven Y Horikoshi
(74) *Attorney, Agent, or Firm* — Muncy, Geissler, Olds & Lowe, P.C.

(57) ABSTRACT

The present utility model discloses a safety focusing ignition flashlight device, including a cylinder, a housing, and several replaceable-members. The housing sleeves an end of the cylinder, and which extends and retracts axially along the cylinder; a first lens is arranged at a light-outlet of the cylinder, and the light-outlet is spliced with any replaceable-member to form a flashlight device; one replaceable-member includes a first end ring, and the ring and the housing hold the first lens; and another replaceable-member includes a second end ring and a second lens fixed on the second end ring wall, the ring and the housing hold the first lens, light emitted from the light outlet gathers to form an ignition point after passing through the first and second lens by adjusting an extension or retraction distance. By changing the replaceable-members, the flashlight device can provide a normal lighting function and satisfy an ignition requirement.

10 Claims, 11 Drawing Sheets

(51) Int. Cl.

| | |
|---|---|
| ***F21V 5/04*** | (2006.01) |
| ***F21V 14/06*** | (2006.01) |
| ***F21V 17/00*** | (2006.01) |
| ***F21V 25/00*** | (2006.01) |
| ***F23Q 13/00*** | (2006.01) |
| *F21L 4/00* | (2006.01) |
| *F21W 131/10* | (2006.01) |

(52) U.S. Cl.
CPC ............. *F23Q 2/32* (2013.01); *F23Q 13/005* (2013.01); *F21L 4/005* (2013.01); *F21W 2131/10* (2013.01)

(56) References Cited

U.S. PATENT DOCUMENTS

| | | | | |
|---|---|---|---|---|
| 2011/0091826 | A1* | 4/2011 | Luo | F23Q 2/32 431/153 |
| 2013/0329408 | A1* | 12/2013 | Windom | F21V 13/04 362/187 |
| 2022/0214017 | A1* | 7/2022 | Butler | F21L 4/005 |
| 2023/0105563 | A1* | 4/2023 | Grandadam | F21L 4/022 362/119 |

* cited by examiner

E-E

SAFETY FOCUSING IGNITION FLASHLIGHT DEVICE

TECHNICAL FIELD

The present utility model relates to the field of flashlight structures, in particular to a safety focusing ignition flashlight device.

DESCRIPTION OF RELATED ART

At present, flashlights are one of necessary tools for activities such as outdoor camping or hiking. However, if fires are required for cooking or warming outdoors, an additional ignition apparatus is usually used, and the conventional flashlight cannot be used as a substitute in the case of lack of such apparatus since the flashlight only performs the function of lighting as a lighting tool.

SUMMARY

In order to overcome the deficiencies of the prior art, the present utility model aims to provide a safety focusing ignition flashlight device, which may provide a normal lighting function and further satisfy an ignition requirement.

One of the objectives of the present utility model is implemented by using the following technical solution:

A safety focusing ignition flashlight device includes a cylinder, a housing, and a plurality of replaceable members;

The housing sleeves an end of the cylinder, and the housing extends and retracts axially along the cylinder;

A first lens is arranged at a light outlet of the cylinder, and the light outlet is spliced with any replaceable member to form a flashlight device;

One replaceable member comprises a first end ring, and the first end ring and the housing hold the first lens; and another replaceable member comprises a second end ring and a second lens fixed on a ring wall of the second end ring, the second end ring and the housing hold the first lens, and by adjusting an extension or retraction distance, light emitted from the light outlet gathers to form an ignition point after passing through the first lens and the second lens.

Further, a light source is arranged in the cylinder, such that an end where the light source is arranged of the cylinder is used as the light outlet of the cylinder.

Further, a flashlight reflector is arranged at the light source, and a ring width of the flashlight reflector gradually increases in an irradiation direction of the light source.

Further, the first lens is a convex lens, and an apex of the first lens is lower than an apex of the first end ring.

Further, the second lens is a convex lens, and an apex of the second lens is lower than an apex of the second end ring.

Further, the second end ring includes an outer ring and a pressing ring, the outer ring and the housing hold the first lens, and the outer ring and the pressing ring hold the second lens.

Further, a vertical inner ring is arranged on an inner ring wall of the outer ring in an extension mode, an inner diameter of the inner ring is smaller than an inner diameter of the outer ring, and the inner ring extends vertically downwards and is screwed into the housing, such that one end of the inner ring and the housing hold the first lens, and the other end of the inner ring and the pressing ring hold the second lens.

Further, a distance between the first lens and the second lens is fixed, and the housing is adjusted to extend and retract to a designated position of the cylinder, such that the light passes through the first lens to form parallel light, and the parallel light gathers after passing through the second lens to form the ignition point.

Further, a limit member for limiting a maximum distance of extension and retraction of the housing is arranged at the end where the light outlet of the cylinder is located.

Further, the flashlight device further includes a tapered locking ring, a bottom end of the tapered locking ring is locked on the second end ring to fix the second lens, a top end of the tapered locking ring is provided with a through hole, and the through hole coincides with a position of the ignition point.

Compared with the prior art, the present utility model has the following beneficial effects:

The flashlight device may provide the normal lighting function under normal circumstances by changing the replaceable member. By replacing the replaceable member including the second end ring, another lens is added and a lens combination of the flashlight device is changed, such that light emitted by the flashlight device may be focused on one point to implement ignition. Therefore, the normal lighting function is provided, and an ignition requirement is satisfied in the case of lack of an ignition apparatus outdoors.

In the figures: 1. housing; 2. cylinder; 3. first lens; 4. light source; 5. flashlight reflector; 6. first replaceable member; 61. first end ring; 7. second replaceable member; 71. second lens; 72. second end ring; 721. outer ring; 722. inner ring;

73. pressing ring; 8. limit member; 9. tapered locking ring; 91. through hole; and 92. heat dissipation hole.

DESCRIPTION OF THE EMBODIMENTS

Hereinafter, the present utility model will be further described with reference to the accompanying drawings and specific embodiments. It should be noted that embodiments or technical features described below can be randomly combined on a non-conflict premise to form a new embodiment.

Figure 4:
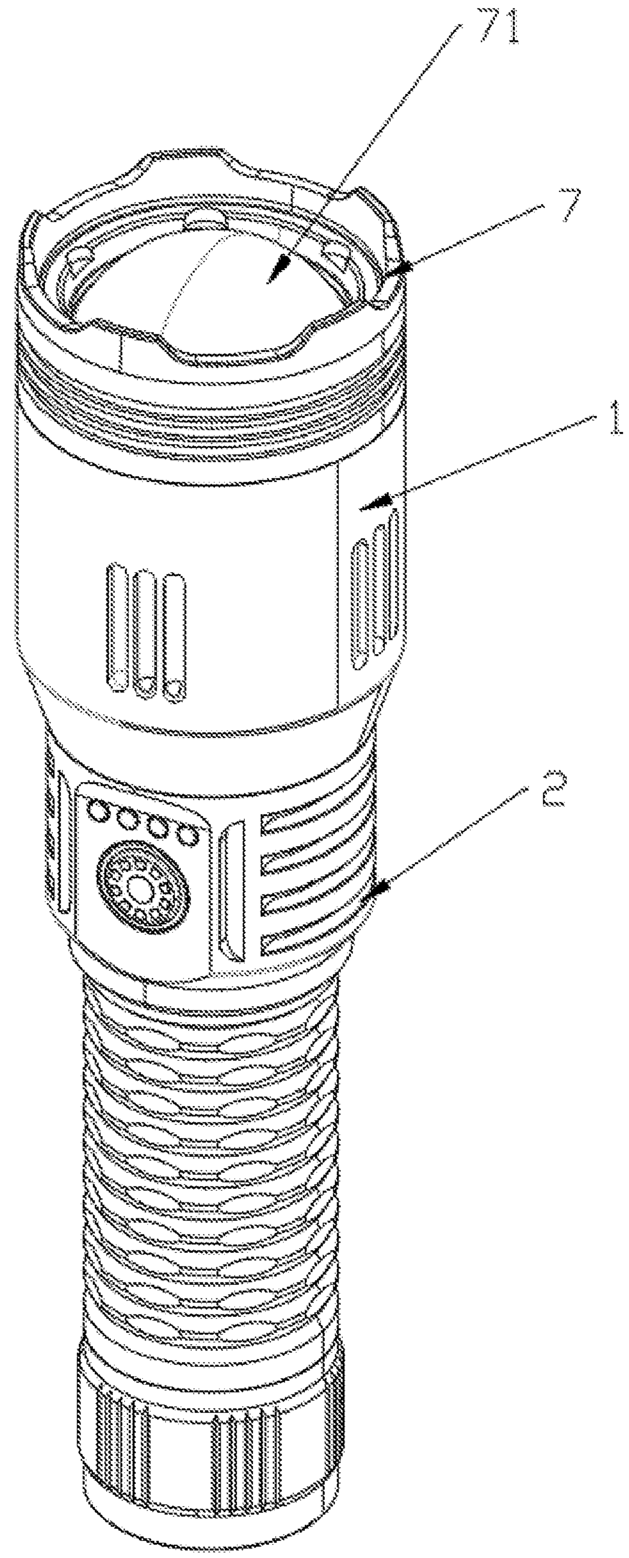
FIG. 4 is a schematic diagram of a three-dimensional structure of a flashlight device equipped with a second replaceable member according to the present utility model.
Figure 5:
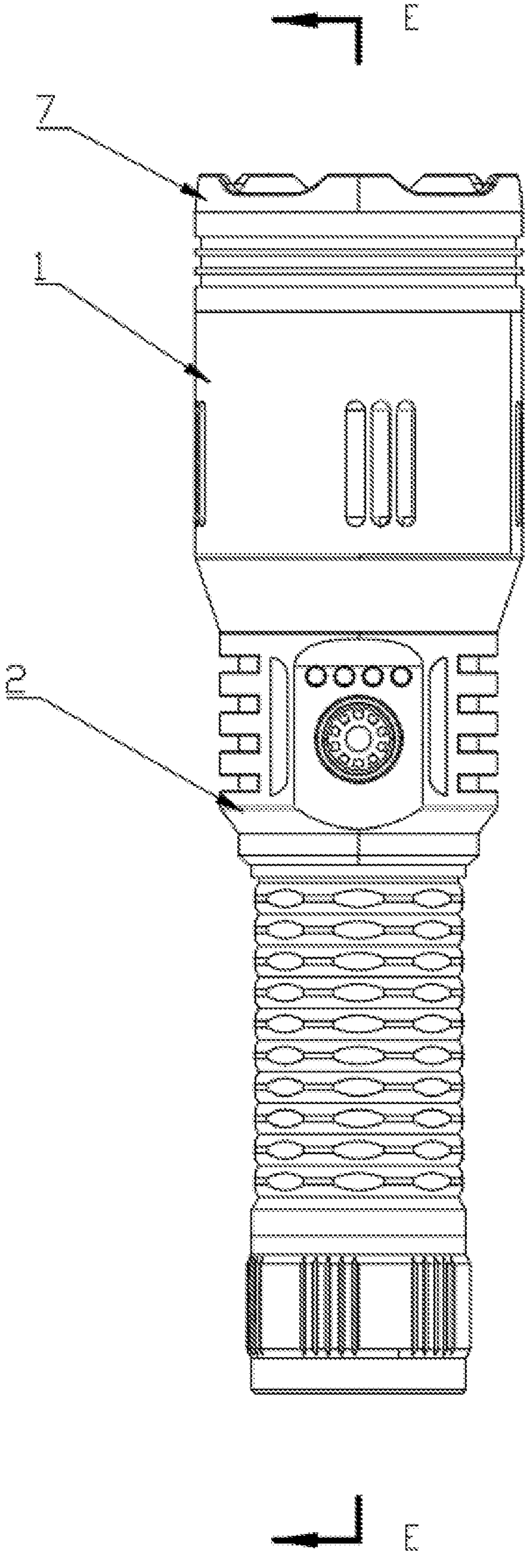
FIG. 5 is a structural diagram of a front view of a flashlight device equipped with a second replaceable member according to the present utility model.

The embodiment provides a safety focusing ignition flashlight device. A lens combination in a flashlight may be changed by changing a replaceable member to satisfy a normal lighting requirement, and focusing of the flashlight may also be changed to implement ignition, so as to satisfy an ignition requirement in the case of lack of an ignition apparatus outdoors. As shown in FIGS. 1, 2, 4, and 5, FIGS. 1 and 2 show a flashlight device equipped with a first replaceable member 6, and FIGS. 4 and 5 show a flashlight device equipped with a second replaceable member 7.

Figure 1:
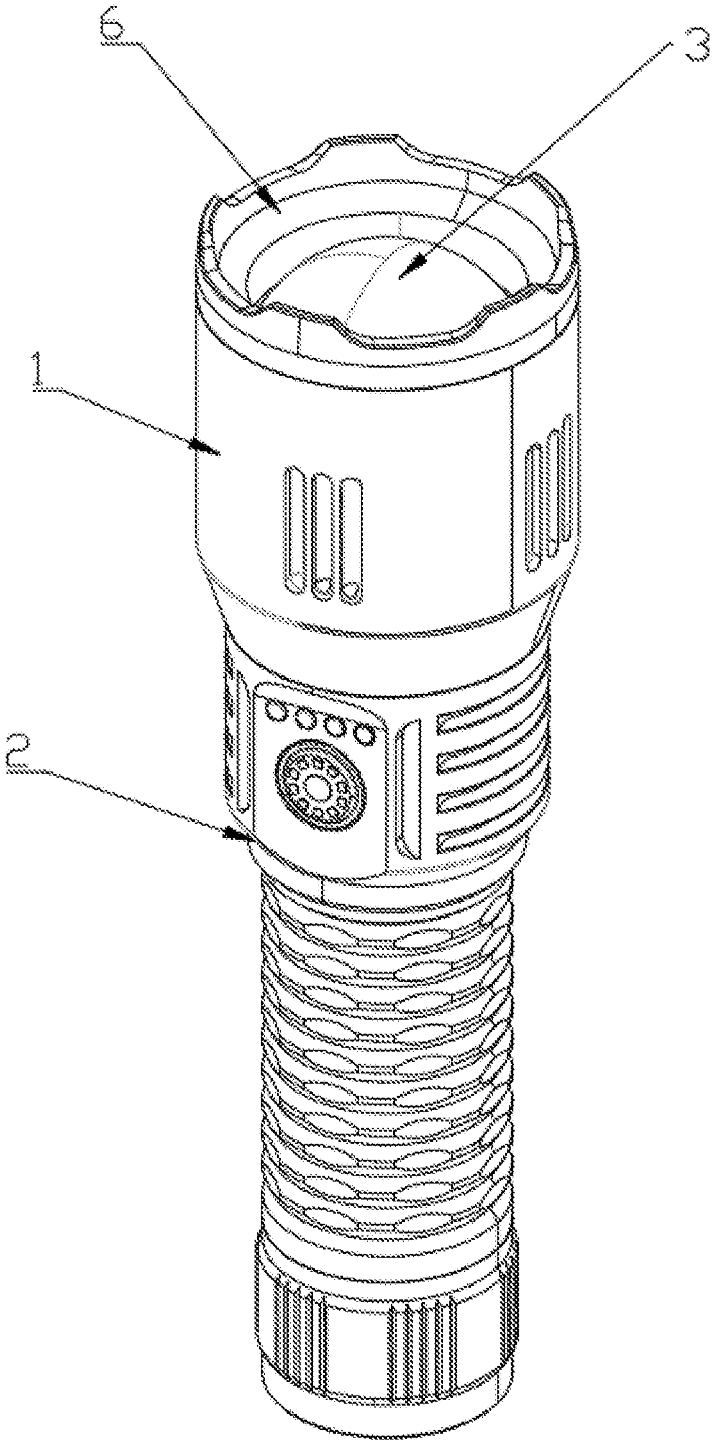
FIG. 1 is a schematic diagram of a three-dimensional structure of a flashlight device equipped with a first replaceable member according to the present utility model.
Figure 2:
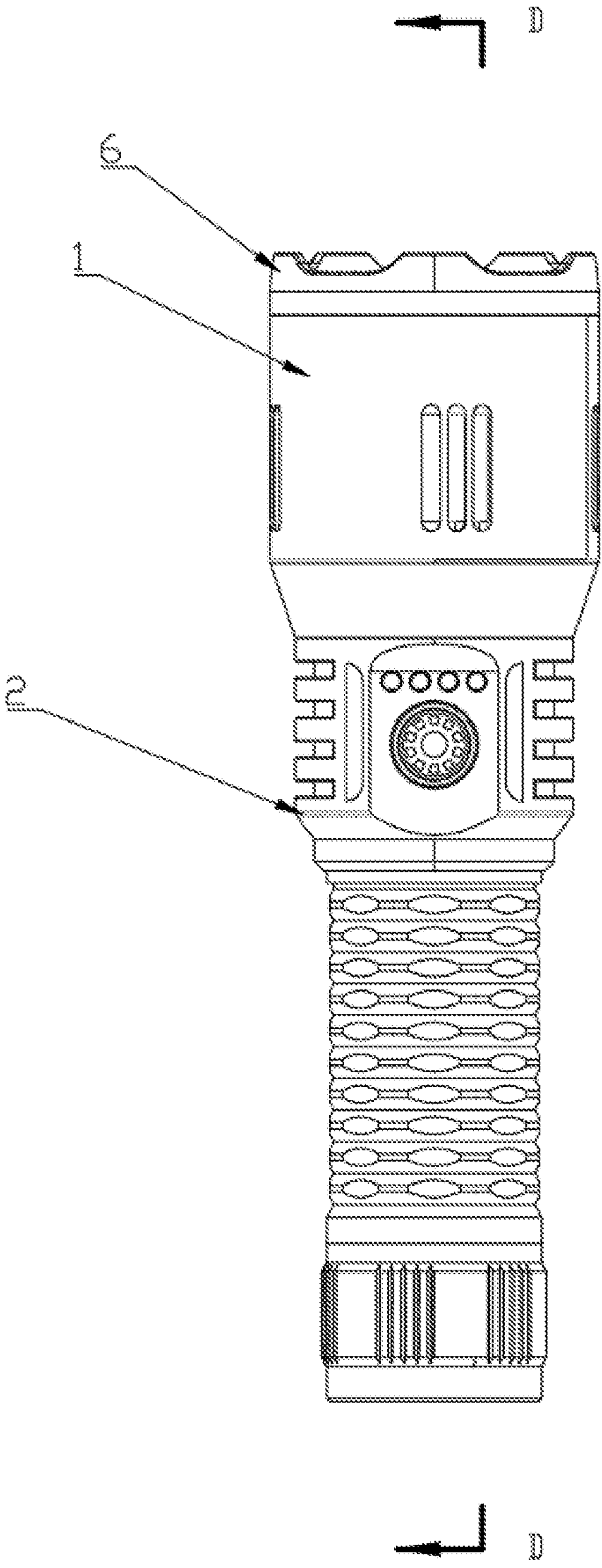
FIG. 2 is a structural diagram of a front view of a flashlight device equipped with a first replaceable member according to the present utility model.
Figure 3:
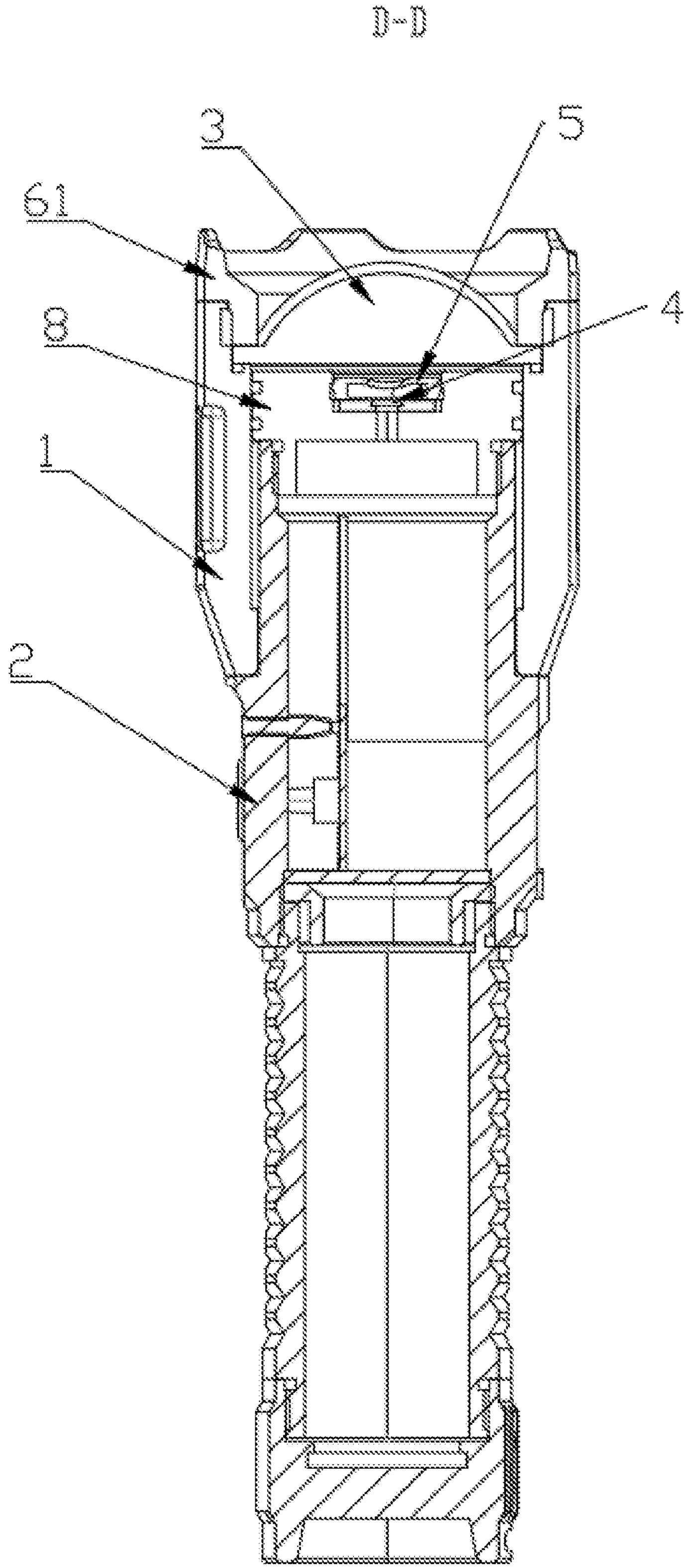
FIG. 3 is a sectional view of a flashlight device equipped with a first replaceable member according to the present utility model.

The flashlight device in this embodiment specifically includes a cylinder 2, a housing 1, and a plurality of replaceable members. With reference to FIG. 3, the cylinder 2 has a cylindrical structure, and a battery and a light source 4 are arranged in the cylinder 2. The battery supplies electric energy to the light source 4, such that the light source 4 may emit light. An end where the light source 4 is located of the cylinder 2 is used as a light outlet of the cylinder 2, and the light source 4 emits light toward the light outlet.

Further, a flashlight reflector 5 is arranged at the light source 4, and a surface of the flashlight reflector 5 is electroplated after a plastic or metal material is molded, such that the flashlight reflector 5 has functions of concentrating light and reflecting. The flashlight reflector 5 has a ring structure hollowed out in the middle, and a ring width of the flashlight reflector 5 gradually increases in an irradiation direction of the light source 4, such that the light emitted by the light source 4 gradually diffuses to the light outlet along the flashlight reflector 5.

A first lens 3 is arranged at the light outlet of the cylinder 2, and the first lens 3 is a convex lens, and may converge the light emitted by the light source 4. The housing 1 sleeves the end where the light outlet is located of the cylinder 2, and the housing 1 may extend and retract axially back and forth along the cylinder 2. A distance between the first lens 3 and the light source 4 may be changed through extension and retraction of the housing 1, a focal length is changed accordingly, and then a light gathering position is changed, that is, a larger focal length is more conducive to focusing, and a smaller focal length is less conducive to focusing.

Moreover, as shown in FIG. 3, a limit member 8 is arranged at the end where the light outlet is located of the cylinder 2, and correspondingly, a bump may be arranged on an inner wall of the housing 1. When the housing 1 moves axially along the cylinder 2, and the bump on the housing 1 abuts against the limit member 8, the housing 1 moves to its maximum stroke, thereby limiting a maximum moving distance of the housing 1 and preventing the housing 1 from falling off the cylinder 2. The limit member 8 has a ring structure hollowed out in a middle, and the flashlight reflector 5 and the light source 4 may be distributed at the hollowed middle position of the limit member 8, so as to save an internal space of the flashlight device and further solve heat conduction and heat dissipation problems of the light source 4.

The flashlight device in this embodiment includes a plurality of replaceable members, and the light outlet of the cylinder 2 is spliced with any replaceable member to form a complete flashlight device. A user may change the replaceable members manually, so as to change a condensing effect of the flashlight device.

Two replaceable members are included in this embodiment, one replaceable member may be named a first replaceable member 6, and the first replaceable member 6 sleeves the light outlet of the flashlight device to achieve a normal lighting function; and the other replaceable member may be named a second replaceable member 7, and the second replaceable member 7 sleeves the light outlet of the flashlight device to achieve an ignition effect, so as to satisfy the ignition requirement in the case of lack of the ignition apparatus outdoors.

With reference to FIG. 3, the first replaceable member 6 includes a first end ring 61, the first end ring 61 has a ring structure, and a middle ring-shaped hollowed position of the first end ring is used for exposing the first lens 3, such that the light emitted by the light source 4 may be emitted through the first lens 3 to achieve a normal lighting effect.

The first end ring 61 is mounted on the housing 1. An outer ring 721 wall of the first end ring 61 may be provided with threads, and an inner ring 722 wall of the housing 1 is also provided with matching threads, such that the first end ring 61 may be screwed into the housing 1 through the threads, and the first end ring 61 and the housing 1 hold the first lens 3 to fix the first lens 3 in position and prevent the first lens 3 from falling off.

Moreover, in order to better protect the first lens 3, an apex of the first lens 3 needs to be lower than an apex of a ring wall of the first end ring 61, so as to avoid excessive protrusion of the first lens 3. The first end ring 61 may protect a surface of the first lens 3 while fixing the first lens 3, so as to improve durability of the flashlight. In some embodiments, a protective lens may be arranged outside the first lens 3, and the protective lens may be a planar lens, and may further protect the first lens 3 without changing a direction of light, so as to avoid fracture of the first lens 3.

After the first replaceable member 6 is mounted on the flashlight device, because the first end ring 61 is connected to the housing 1, the first replaceable member 6 and the first lens 3 synchronously extend and retract with the housing 1 while the housing 1 extends and retracts, and a lighting range is changed by changing the distance between the first lens 3 and the light source 4.

When replaced with the second replaceable member 7, the first replaceable member 6 may be detached. Even if the first replaceable member 6 is detached, the first lens 3 is still located at the light outlet of the flashlight device. In this case, only the second replaceable member 7 is mounted to change the lens combination of the flashlight device, so as to achieve an ignition effect.

Figure 6:
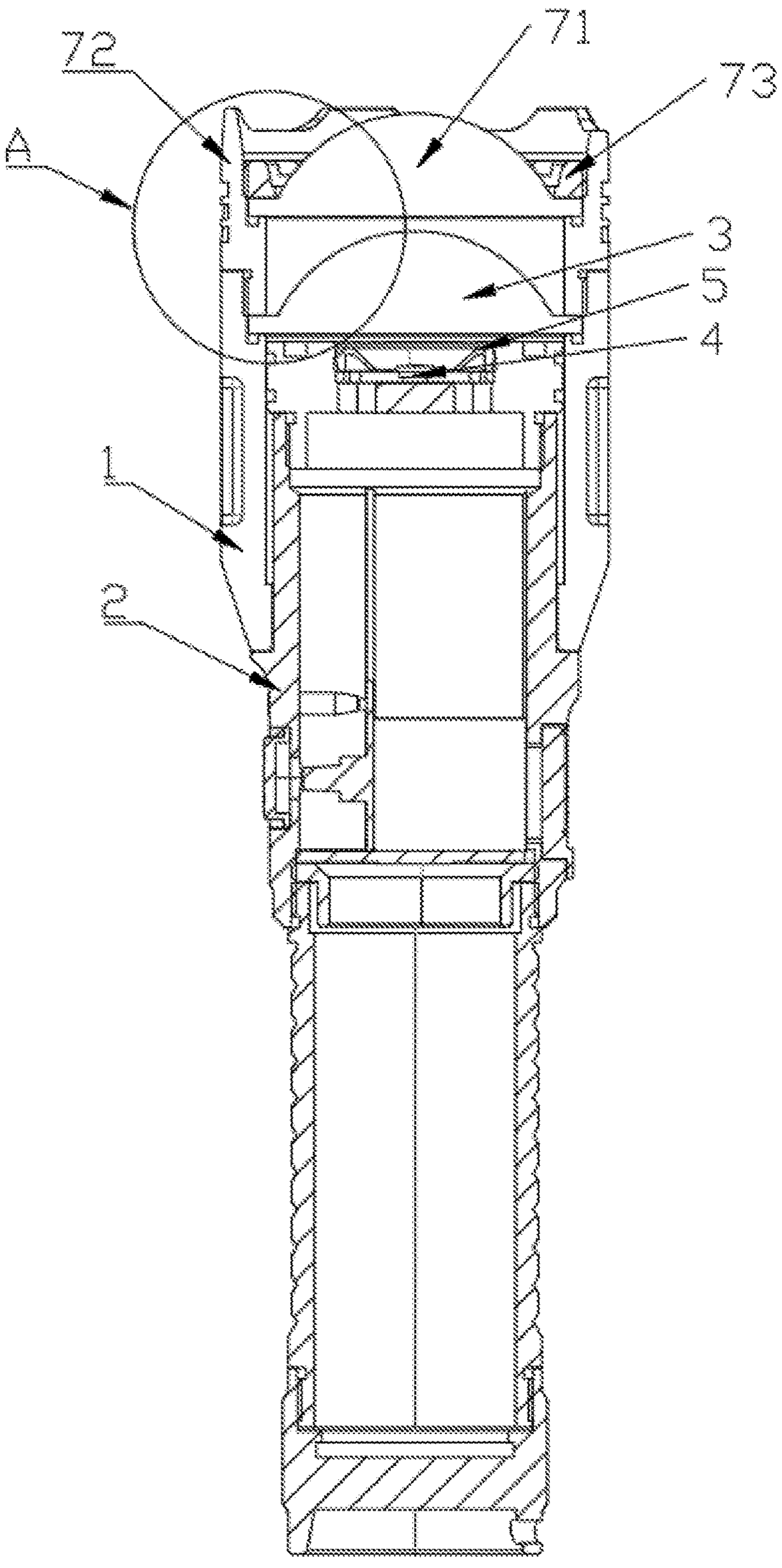
FIG. 6 is a sectional view of a flashlight device equipped with a second replaceable member according to the present utility model.

As shown in FIG. 6, the second replaceable member 7 includes a second end ring 72 and a second lens 71. In this embodiment, the second lens 71 is also a convex lens. The second lens 71 is fixed on a ring wall of the second end ring 72, and the second lens 71 and the first lens 3 are kept horizontally. After the second end ring 72 is mounted, the first lens 3 is held by the second end ring 72 and the housing 1 together, such that an internal structure of the flashlight device is kept stable. By adjusting an extension or retraction distance, the light emitted from the light outlet gathers to form an ignition point after passing through the first lens 3 and the second lens 71.

Moreover, an apex of the second lens 71 is also lower than an apex of the second end ring 72, so as to avoid excessive protrusion of the second lens 71. The second end ring 72 may protect a surface of the second lens 71 at an outermost end while fixing the first lens 3 and the second lens 71, so as to avoid fracture of the second lens 71. In some embodiments, a protective lens may be arranged outside the second lens 71, and the protective lens may be a planar lens, and may further protect the second lens 71 without changing the direction of light, so as to improve durability of the second lens 71.

Figure 7:
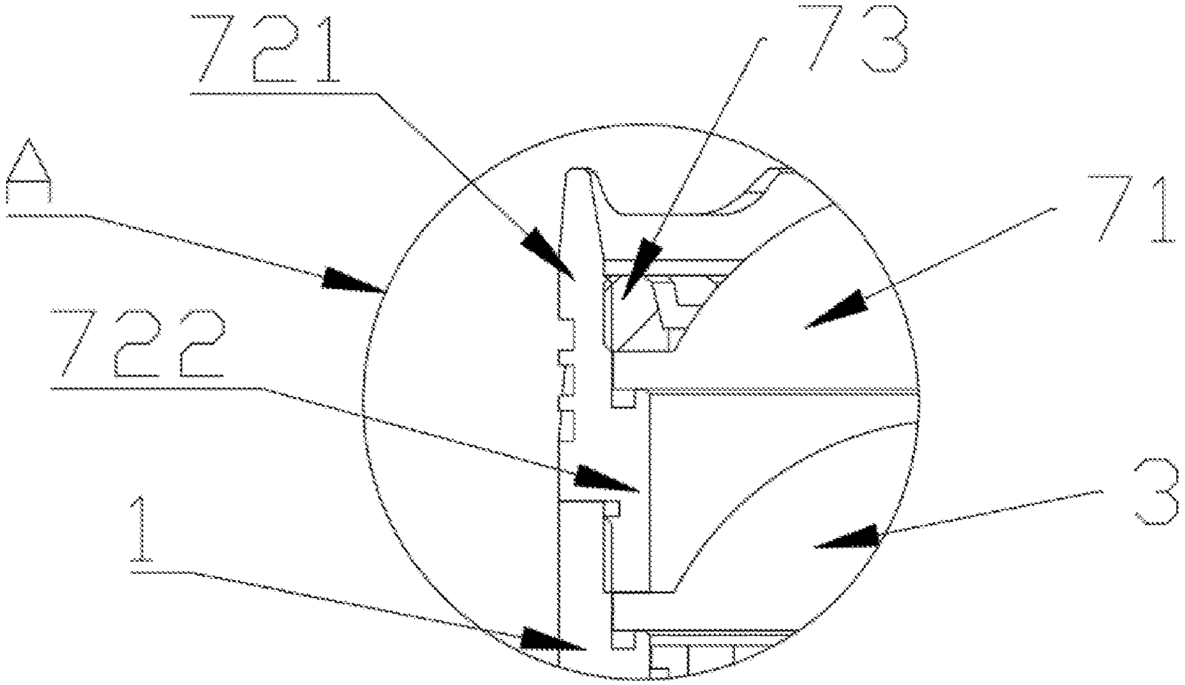
FIG. 7 is a partial enlarged view of FIG. 6.

As shown in FIGS. 6 and 7, the second end ring 72 in this embodiment specifically includes an outer ring 721 and a pressing ring 73, the outer ring 721 and the housing 1 hold the first lens 3, and the outer ring 721 and the pressing ring 73 hold the second lens 71, so as to ensure structural stability of the lenses in the flashlight.

As shown in FIG. 7, a vertical inner ring 722 is arranged on an inner ring 722 wall of the outer ring 721 in an extension mode, the inner ring 722 and the outer ring 721 may be molded integrally, and an inner diameter of the inner ring 722 is smaller than an inner diameter of the outer ring 721. Threads may be arranged on the inner ring 722, and the inner ring 722 extends vertically downward and is screwed into the housing 1 through the threads, such that one end of the inner ring 722 and the housing 1 hold first lens 3. The second lens 71 is placed at the other end of the inner ring 722, and the pressing ring 73 is mounted on the second lens 71, such that an upper end of the inner ring 722 and the pressing ring 73 jointly hold the second lens 71 to fix the second lens 71 in position.

A distance between the first lens 3 and the second lens 71 is fixed, and a specific distance between the first lens 3 and the second lens 71 may be determined experimentally. After the second replaceable member 7 is connected to the housing 1, because the second end ring 72 is connected to the housing 1, the second replaceable member 7 and the first lens 3 extend and retract synchronously with the housing 1 while the housing 1 extends and retracts. By changing the distance between the first lens 3 and the light source 4 and the distance between the second lens 71 and the light source, a focusing position of light is changed. When the housing 1 is adjusted to extend and retract to a designated position of the cylinder 2, the light focuses at a point after passing through the first lens 3 and the second lens 71 to heat the light focusing point. If the light focusing point is close to a combustible, the combustible may be ignited to satisfy the outdoor ignition requirement.

Figure 8:
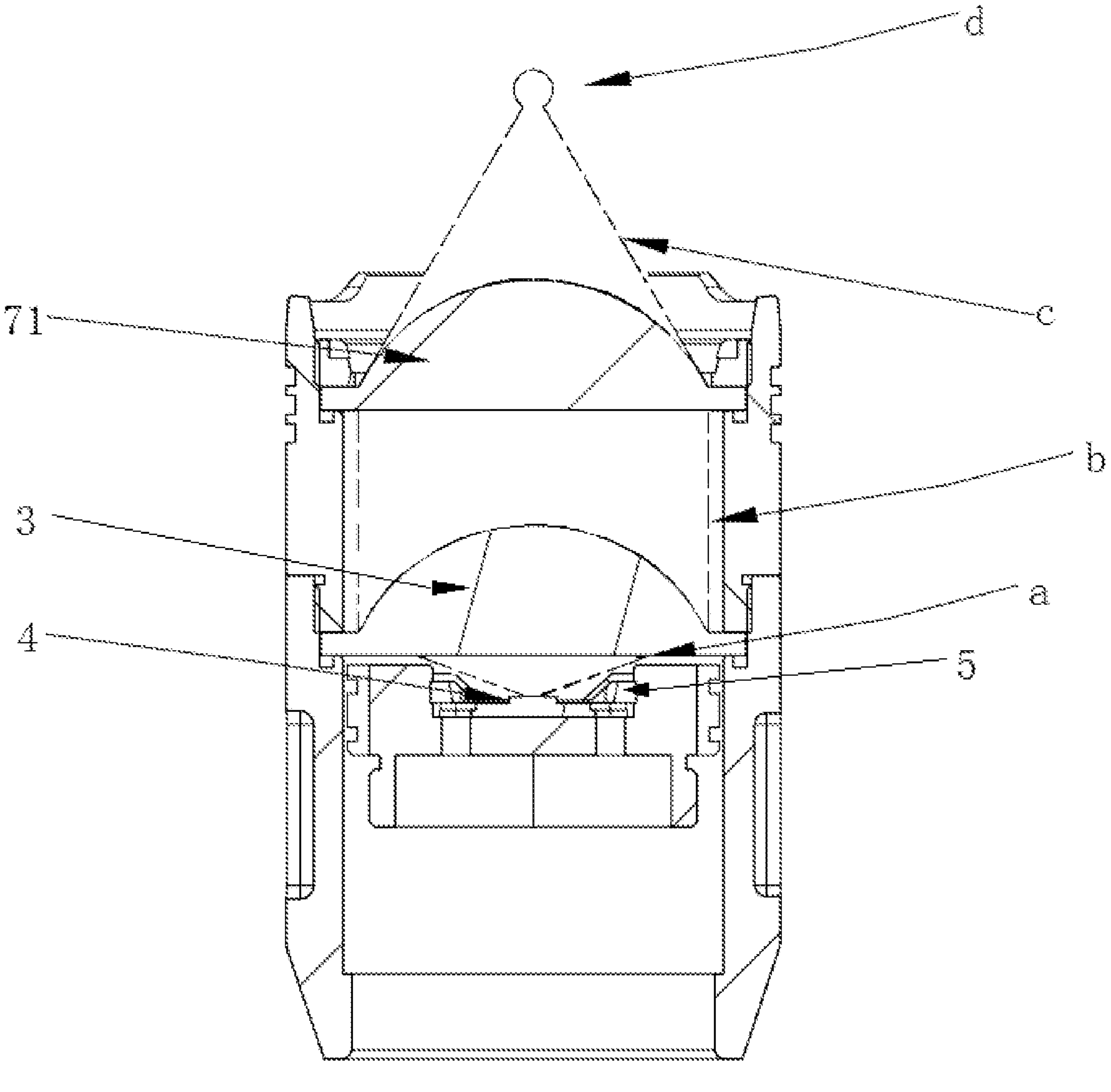
FIG. 8 is a schematic diagram of light gathering of a flashlight device equipped with a second replaceable member according to the present utility model.

As shown in FIG. 8, dotted lines in FIG. 8 show a direction of light propagation, that is, when the flashlight device extends and retracts to some positions, in a light path a in FIG. 8, light emitted by the light source 4 diffuses to the first lens 3 along the flashlight reflector 5; in a light path b, parallel light is generated after the light is converged by the first lens 3; and in a light path c, parallel light propagates through the second lens 71 and gathers to form an ignition point d.

It should be noted that the first end ring 61 and the second end ring 72 may alternatively be connected to the housing 1 in a detachable manner through buckling or other means, and all types of detachable connection structures will not be described herein.

Figure 9:
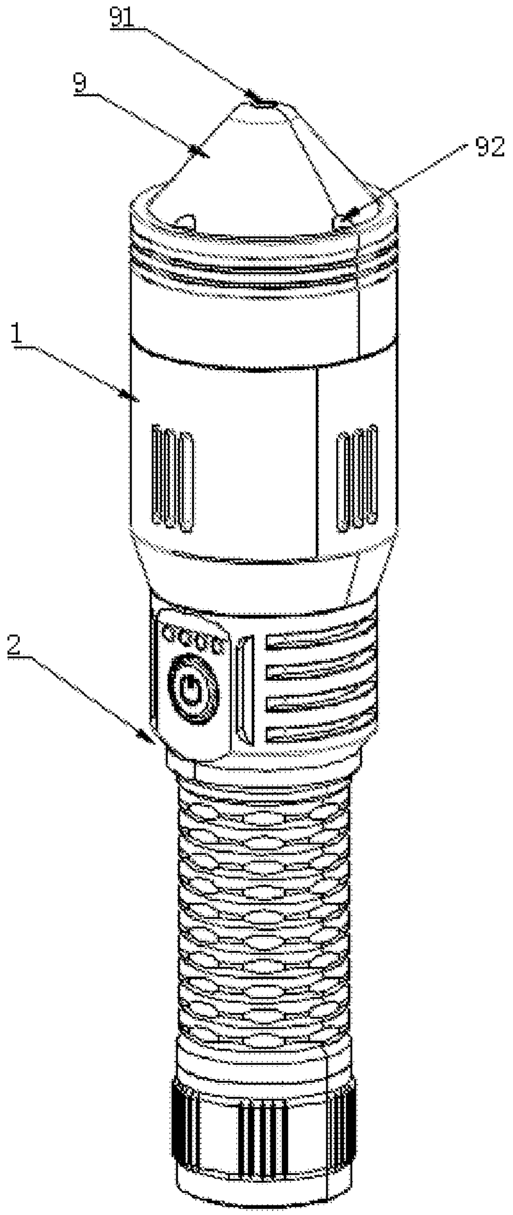
FIG. 9 is a schematic diagram of a three-dimensional structure of a flashlight device equipped with a tapered locking ring according to the present utility model.
Figure 10:
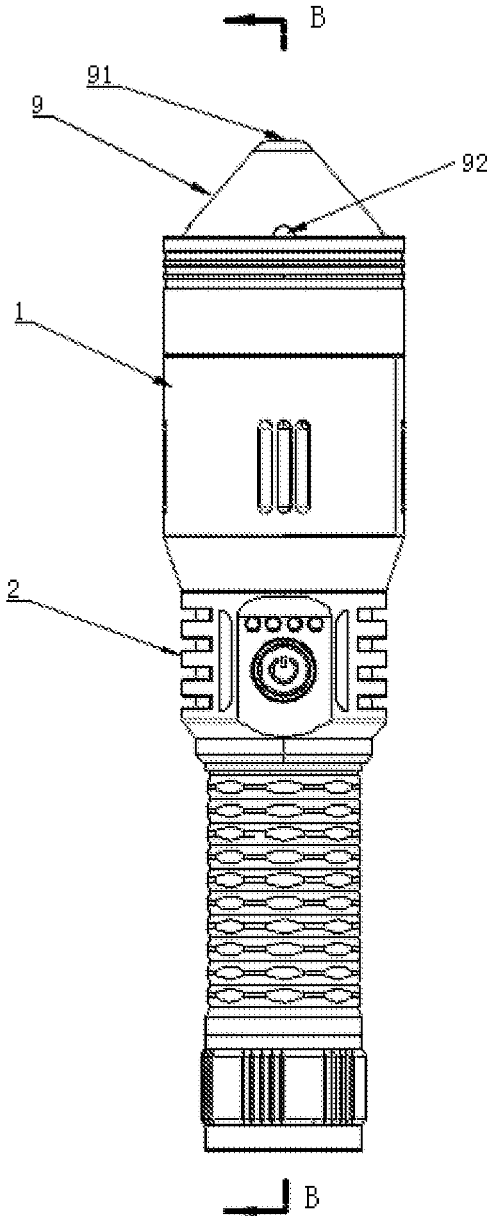
FIG. 10 is a schematic structural diagram of a front view of a flashlight device equipped with a tapered locking ring according to the present utility model.
Figure 11:
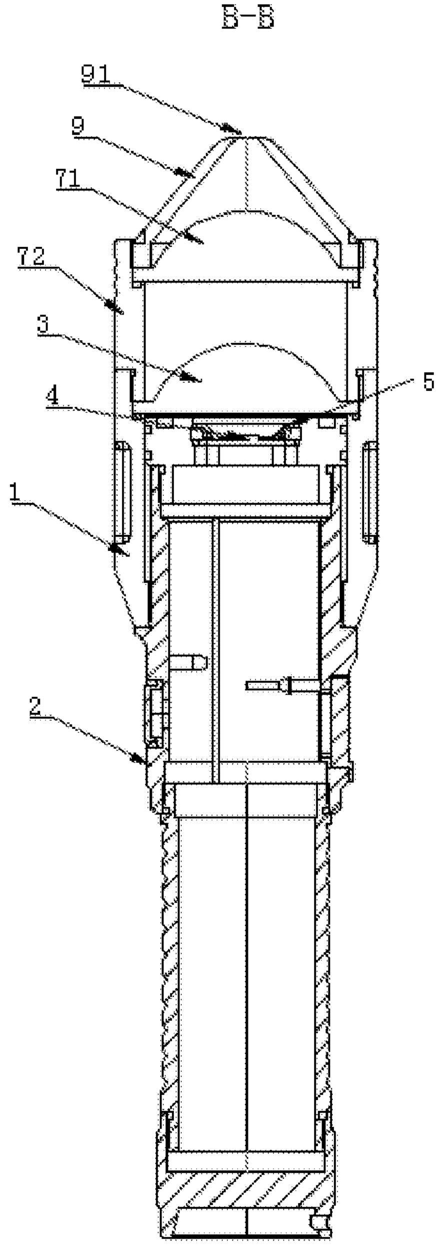
FIG. 11 is a sectional view of a flashlight device equipped with a tapered locking ring according to the present utility model.

As shown in FIG. 8, the light focuses at the ignition point d and generates a high temperature after passing through the second lens 71, and improper use in this case is likely to lead to burn or scald of a user. Therefore, as shown in FIGS. 9 to 11, the flashlight device may further include a tapered locking ring 9. When the replaceable member of the flashlight device is replaced with the second replaceable member 7, the pressing ring 73 on the second replaceable member 7 may be detached, and a bottom end of the tapered locking ring 9 is locked on the second end ring 72. As shown in FIG. 11, the tapered locking ring 9 presses the second lens 71 to achieve an effect of fixing the second lens 71. Moreover, a top end of the tapered locking ring 9 is provided with a through hole 91, and a horizontal height of the through hole 91 is related to a focusing point position of the lens. In this embodiment, the through hole 91 is guaranteed to coincide with the ignition point in position. In addition, as shown in FIGS. 9 and 10, heat dissipation holes 92 may further be provided on the periphery of the bottom end of the tapered locking ring 9 to dissipate heat in the tapered locking ring 9, so as to avoid an excessive temperature.

In this embodiment, the tapered locking ring 9 is arranged above the second lens 71, to protect the user without affecting light focusing and prevent the user from being burnt by the high temperature generated by the light focusing. The user may also quickly find the ignition point of the flashlight device through the through hole 91 to ignite a combustible, thereby greatly improving safety of the flashlight device.

The foregoing embodiments are merely preferred embodiments of the present utility model, and cannot be used to limit the protection scope of the present utility model. Any non-substantial change and substitution made by those skilled in the art on the basis of the present utility model shall fall within the protection scope of the present utility model.

What is claimed is:

1. A safety focusing ignition flashlight device, comprising a cylinder, a housing, and a plurality of replaceable members; wherein the housing sleeves an end of the cylinder, and the housing extends and retracts axially along the cylinder;

a first lens is arranged at a light outlet of the cylinder, and the light outlet is spliced with any replaceable member to form a flashlight device; and one replaceable member comprises a first end ring, and the first end ring and the housing hold the first lens; and another replaceable member comprises a second end ring and a second lens fixed on a ring wall of the second end ring, the second end ring and the housing hold the first lens, and by adjusting an extension or retraction distance, light emitted from the light outlet gathers to form an ignition point after passing through the first lens and the second lens.

2. The safety focusing ignition flashlight device according to claim 1, wherein a light source is arranged in the cylinder, such that an end where the light source is arranged of the cylinder is used as the light outlet of the cylinder.

3. The safety focusing ignition flashlight device according to claim 2, wherein a flashlight reflector is arranged at the light source, and a ring width of the flashlight reflector gradually increases in an irradiation direction of the light source.

4. The safety focusing ignition flashlight device according to claim 1, wherein the first lens is a convex lens, and an apex of the first lens is lower than an apex of the first end ring.

5. The safety focusing ignition flashlight device according to claim 1, wherein the second lens is a convex lens, and an apex of the second lens is lower than an apex of the second end ring.

6. The safety focusing ignition flashlight device according to claim 1, wherein the second end ring comprises an outer ring and a pressing ring, the outer ring and the housing hold the first lens, and the outer ring and the pressing ring hold the second lens.

7. The safety focusing ignition flashlight device according to claim 6, wherein a vertical inner ring is arranged on an inner ring wall of the outer ring in an extension mode, an inner diameter of the inner ring is smaller than an inner diameter of the outer ring, and the inner ring extends vertically downwards and is screwed into the housing, such that one end of the inner ring and the housing hold the first lens, and the other end of the inner ring and the pressing ring hold the second lens.

8. The safety focusing ignition flashlight device according to claim 1, wherein a distance between the first lens and the second lens is fixed, and the housing is adjusted to extend and retract to a designated position of the cylinder, such that the light passes through the first lens to form parallel light, and the parallel light gathers after passing through the second lens to form the ignition point.

9. The safety focusing ignition flashlight device according to claim 1, wherein a limit member for limiting a maximum distance of extension and retraction of the housing is arranged at the end where the light outlet of the cylinder is located.

10. The safety focusing ignition flashlight device according to claim 1, wherein the flashlight device further comprises a tapered locking ring, a bottom end of the tapered locking ring is locked on the second end ring to fix the second lens, a top end of the tapered locking ring is provided with a through hole, and the through hole coincides with a position of the ignition point.

* * * * *